United States Patent
Oxaal

(10) Patent No.: US 6,243,099 B1
(45) Date of Patent: Jun. 5, 2001

(54) METHOD FOR INTERACTIVE VIEWING FULL-SURROUND IMAGE DATA AND APPARATUS THEREFOR

(76) Inventor: Ford Oxaal, 42 Western Ave., Cohoes, NY (US) 12047

( * ) Notice: Subject to any disclaimer, the term of this patent is extended or adjusted under 35 U.S.C. 154(b) by 0 days.

(21) Appl. No.: 09/228,760

(22) Filed: Jan. 12, 1999

Related U.S. Application Data

(63) Continuation-in-part of application No. 08/749,166, filed on Nov. 14, 1996, now Pat. No. 5,903,782.
(60) Provisional application No. 60/071,148, filed on Jan. 12, 1998.

(51) Int. Cl.[7] .............................. G09G 3/04; G06T 15/00
(52) U.S. Cl. ..................... 345/430; 345/427; 382/293; 382/294
(58) Field of Search ................................. 345/430, 431, 345/427, 424, 425, 428, 419; 382/181, 190, 154, 285, 276, 164, 162, 293, 294; 396/584; 428/141; 348/48; 600/411, 425

(56) References Cited

U.S. PATENT DOCUMENTS

| | | | |
|---|---|---|---|
| 5,396,583 | * 3/1995 | Chen et al. ......................... | 345/427 |
| 5,699,497 | * 12/1997 | Erdahl et al. ........................ | 345/428 |
| 5,951,475 | * 9/1999 | Gueziec et al. ..................... | 600/425 |
| 5,973,700 | * 10/1999 | Taylor et al. ........................ | 345/427 |
| 6,016,439 | * 1/2000 | Acker ................................... | 600/411 |
| 6,028,955 | * 2/2000 | Cohen et al. ........................ | 382/154 |
| 6,031,540 | * 2/2000 | Golin et al. ......................... | 345/419 |
| 6,084,979 | * 7/2000 | Kanade et al. ...................... | 382/154 |

OTHER PUBLICATIONS

Suya You, "Interactive Volume Rendering for Vitural Colonoscopy", Visualization '97., Proceedings , 1997, pp. 433–436, 571.*

* cited by examiner

Primary Examiner—Mark R. Powell
Assistant Examiner—Thu-Thao Havan
(74) Attorney, Agent, or Firm—Westerlund•Powell, P.C.; Raymond H. J. Powell, Jr.; Robert A. Westerlund

(57) ABSTRACT

A method of modeling of the visible world using full-surround image data includes steps for selecting a view point within a p-surface, and texture mapping full-surround image data onto the p-surface such that the resultant texture map is substantially equivalent to projecting full-surround image data onto the p-surface from the view point to thereby generate a texture mapped p-surface. According to one aspect of the invention, the method also includes a step for either rotating the texture mapped p-surface or changing the direction of view to thereby expose a new portion of the texture mapped p-surface. According to another aspect of the invention, a first the texture mapped p-sphere is replaced by a second texture mapped p-sphere by interactively selecting the new viewpoint from viewpoints within the second texture mapped p-sphere. A corresponding apparatus is also described.

22 Claims, 16 Drawing Sheets

FIG. 9A

```c
/* Includes required */
#include <GL/gl.h>
include <GL/glut.h>
#include <stdio.h>
#include <ppm.h>
#include <math.h>

/**
 * something because of windows
 */
void __eprintf() {
}

/**
 * our data structure of choice
 */
typedef struct obj {
    /* other parameters */
    float matrix[16];

/* view angle */
    float viewangle;

/* aspect ratio */
    float aspect;

/* z of the camera */
    float tz;

/* ry of the camera */
    float ry;
} Obj;

/* hold the display lists for textures */
typedef struct texture {
    int tex1;
    int tex2;
} Texture;

/**
 * our global variables
 */
/* camera settings */
Obj scene;
```

FIG. 9B

```c
/* texture stuff */
Texture def;
Texture* current_texture = &def;

/* track the next display list number */
int nextDLnum = 2;

/* stuff for lighting */
float lightPos[4] = {2.0, 4.0, 2.0, 0};
float lightDir[4] = {0, 0, 1.0, 1.0};
float lightAmb[4] = {0.4, 0.4, 0.4, 1.0};
float lightDiff[4] = {0.8, 0.8, 0.8, 1.0};
float lightSpec[4] = {0.8, 0.8, 0.8, 1.0};
int lights = 0;
int outsideView = 0;
int parent;

#define HEMISPHERE 1
void createHemisphere(int listNum, int numPts, int geom);

/**
 * Read in the ppm files and create display lists for a texture
 * returns the dimension of the image
 */
pixel **map1, **map2;
GLubyte *tex1, *tex2, **tmpPP, *tmpP;
void readTexture(Texture* t, char* file1, char* file2) {
    FILE *fp1, *fp2;
    int cols, rows, i, j, index;
    pixval maxval;

/* open the files */
    fp1 = fopen(file1, "r");
    fp2 = fopen(file2, "r");
    if (!fp1) {
     fprintf(stderr, "Couldn't open %s\n", file1);
    }
    if (!fp2) {
     fprintf(stderr, "Couldn't open %s\n", file2);
    }

/* read the ppm files */
    map1 = ppm_readppm(fp1, &cols, &rows, &maxval);
    fprintf(stderr, "%s: rows = %d \t cols = %d\n", file1, rows,
    cols, maxval);
    map2 = ppm_readppm(fp2, &cols, &rows, &maxval);
```

FIG. 9C

```
    fprintf(stderr, "%s: rows = %d \t cols = %d\n", file2, rows,
cols, maxval);

/* convert them */
    tex1 = malloc(sizeof(GLubyte) * rows * cols * 3);
    tex2 = malloc(sizeof(GLubyte) * rows * cols * 3);
    index = 0;
    for (i = 0; i < rows; i++) {
     for (j = 0; j < cols; j++) {
        /* R */
        tex1[index] = PPM_GETR(map1[i][j]);
        tex2[index] = PPM_GETR(map2[i][j]);
        index ++;

/* G */
        tex1[index] = PPM_GETG(map1[i][j]);
        tex2[index] = PPM_GETG(map2[i][j]);
        index ++;

/* B */
        tex1[index] = PPM_GETB(map1[i][j]);
        tex2[index] = PPM_GETB(map2[i][j]);
        index ++;
     }
    }

/* create the textures */
    /* new display list*/
    glNewList(nextDLnum, GL_COMPILE);
    t->tex1 = nextDLnum;
    nextDLnum++;
    glTexImage2D(GL_TEXTURE_2D, 0, 3, cols, rows, 0, GL_RGB,
GL_UNSIGNED_BYTE,
          tex1);
    glEndList();

/* new display list*/
    glNewList(nextDLnum, GL_COMPILE);
    t->tex2 = nextDLnum;
    nextDLnum++;
    glTexImage2D(GL_TEXTURE_2D, 0, 3, cols, rows, 0, GL_RGB,
GL_UNSIGNED_BYTE'
          tex2);
    glEndList();
}
```

FIG. 9D

```
/**
 * this will initialize the display lists for the objects
 */
void initialize_objects(int argc, char**argv) {
    float tmp[4];

/* read in the texture */
    readTexture(&def, argv[1], argv[2]);

/* create hemisphere */
    createHemisphere(1, 50, GL_TRIANGLE_STRIP);

/* scene */
    scene.viewangle = 130;
    scene.tz = 0;
    scene.ry = 0;
}

/*
 * Clear the screen. draw the objects
 */
void display()
{
    float tmp[4];
    float height;

/* clear the screen */
    glClear(GL_COLOR_BUFFER_BIT | GL_DEPTH_BUFFER_BIT);

/* adjust for scene orientation */
    glMatrixMode(GL_PROJECTION);
    if (outsideView) {
     glLoadIdentity();
     gluPerspective(45, scene.aspect, 0.1, 10.0);
     glTranslatef(0, 0, -3);
     glRotatef(45, 1, 0, 0);
     glRotatef(45, 0, 1, 0);
     glDisable(GL_TEXTURE_2D);
     glColor3f(.8, .8, .8);
    } else {
     glLoadIdentity();
     gluPerspective(scene.viewangle, scene.aspect, 0.1, 10.0);
     glTranslatef(0, 0, scene.tz);
     glRotatef(scene.ry, 0, 1, 0);
    }
```

FIG. 9E

```
/* draw our models */
glMatrixMode(GL_MODELVIEW);
glPushMatrix();

if (outsideView) {
 /* transform to where the camera would be */
 glPushMatrix();

/* draw a cube for the camera */
 glLoadIdentity();
 glRotatef(180, 1, 0, 0);
 glTranslatef(0, 0, scene.tz);
 tmp[0] = tmp[1] = tmp[2] = .8;
 tmp[3] = 1;
 glMaterialfv(GL_FRONT_AND_BACK, GL_SPECULAR, tmp);
 glMaterialf(GL_FRONT_AND_BACK, GL_SHININESS, 0.0);
 glMaterialfv(GL_FRONT_AND_BACK, GL_AMBIENT_AND_DIFFUSE, tmp);
 glutSolidCube(.1);

/* draw a cone for the view frustrum */
 glLoadIdentity();
 height = 1 - scene.tz;
 glRotatef(45, 0, 0, 1);
 glTranslatef(0, 0, -1);
 tmp[0] = tmp[1] = 1;
 tmp[2] = 0;
 tmp[3] = .3;
 glMaterialfv(GL_FRONT_AND_BACK, GL_SPECULAR, tmp);
 glMaterialf(GL_FRONT_AND_BACK, GL_SHININESS, 0.0);
 glMaterialfv(GL_FRONT_AND_BACK, GL_AMBIENT_AND_DIFFUSE, tmp);
 glutSolidCone(tan(scene.viewangle * 3.14 / 360.0) * height,
height, 20, 1);
 glPopMatrix();
 glEnable(GL_TEXTURE_2D);
}

/* now draw the semisphere */
if (lights) {
 tmp[0] = tmp[1] = tmp[2] = .8;
 tmp[3] = .8;
 glMaterialfv(GL_FRONT_AND_BACK, GL_SPECULAR, tmp);
 glMaterialf(GL_FRONT_AND_BACK, GL_SHININESS, 10.0);
 glMaterialfv(GL_FRONT_AND_BACK, GL_AMBIENT_AND_DIFFUSE, tmp);
}
glCallList(current_texture->tex1);
glCallList(HEMISPHERE);
```

FIG. 9F

```
    if (lights) {
     tmp[0] = tmp[1] = tmp[2] = .5;
     tmp[3] = .5;
     glMaterialfv(GL_FRONT_AND_BACK, GL_SPECULAR, tmp);
     glMaterialf(GL_FRONT_AND_BACK, GL_SHININESS, 10.0);
     glMaterialfv(GL_FRONT_AND_BACK, GL_AMBIENT_AND_DIFFUSE, tmp);
    } glRotatef(180.0, 0.0, 0.0, 1.0);
    glCallList(current_texture->tex2);
    glCallList(HEMISPHERE);
    glPopMatrix();

fprintf(stderr, "%s\n", gluErrorString(glGetError()));
    glutSwapBuffers();
}

/*
 * Handle Menus
 */
#define M_QUIT 1
void Select(int value)
{
    switch (value) {
    case M_QUIT:
        exit(0);
        break;
    }
    glutPostRedisplay();
}
void create_menu() {
    fprintf(stderr, "Press ? for help\n");
    glutCreateMenu(Select);
    glutAddMenuEntry("Quit", M_QUIT);
    glutAttachMenu(GLUT_RIGHT_BUTTON);
}

/* Initializes hading model */
void myInit(void)
{
    glEnable(GL_DEPTH_TEST);
    glShadeModel(GL_SMOOTH);

/* texture stuff */
    glPixelStorei(GL_UNPACK_ALIGNMENT, sizeof(GLubyte));
    glTexParameterf(GL_TEXTURE_2D, GL_TEXTURE_WRAP_S, GL_CLAMP);
    glTexParameterf(GL_TEXTURE_2D, GL_TEXTURE_WRAP_T, GL_CLAMP);
```

FIG. 9G

```
    glTexParameterf(GL_TEXTURE_2D, GL_TEXTURE_MAG_FILTER,
GL_NEAREST);
    glTexParameterf(GL_TEXTURE_2D, GL_TEXTURE_MIN_FILTER,
GL_NEAREST);
    glTexEnvf(GL_TEXTURE_ENV, GL_TEXTURE_ENV_MODE, GL_DECAL);
    glEnable(GL_TEXTURE_2D);

}

/*
 * Called when the window is first opened and whenever
 * the window is reconfigured (moved or resized).
 */
void myReshape(int w, int h)
{
    glViewport (0, 0, w, h);              /* define the viewport */
    scene.aspect = 1.0*(GLfloat)w/(GLfloat)h;
    glMatrixMode(GL_PROJECTION);
    glLoadIdentity();
    gluPerspective(scene.viewangle, scene.aspect, 0.1, 10.0);
    glMultMatrixf(scene.matrix);
    glMatrixMode (GL_MODELVIEW);          /* back to modelview
    matriix */
}

/*
 * Keyboard handler
 */
void
Key(unsigned char key, int x, int y)
{
    float matrix[16];
    glMatrixMode(GL_MODELVIEW);
    glGetFloatv(GL_MODELVIEW_MATRIX, matrix);
    glLoadIdentity();
    fprintf(stderr, "%d - %c  ", key, key);
    switch (key) {
    case 'o':
     if (!outsideView) {
        fprintf(stderr, "outside on  ");
        outsideView = 1;

/* turn on blending */
        glEnable(GL_BLEND);
        glBlendFunc(GL_SRC_ALPHA, GL_ONE_MINUS_SRC_ALPHA);
```

FIG. 9H

```
    /* We want to see color */
    glTexEnvf(GL_TEXTURE_ENV, GL_TEXTURE_ENV_MODE, GL_MODULATE);

/* turn on our spotlight */
    glEnable(GL_LIGHT1);
    glLightfv(GL_LIGHT1, GL_AMBIENT, lightAmb);
    glLightfv(GL_LIGHT1, GL_DIFFUSE, lightDiff);
    glLightfv(GL_LIGHT1, GL_SPECULAR, lightSpec);
    glLightfv(GL_LIGHT1, GL_SPOT_DIRECTION, lightDir);
  } else {
    fprintf(stderr, "outside off  ");
    outsideView = 0;
    glTexEnvf(GL_TEXTURE_ENV, GL_TEXTURE_ENV_MODE, GL_DECAL);
    glDisable(GL_BLEND);
  }
 break;
case 'F':
 fprintf(stderr, "flat   ");
 glShadeModel(GL_FLAT);
 break;
case 'f':
 fprintf(stderr, "smooth   ");
 glShadeModel(GL_SMOOTH);
 break;
case 'y':
 printf("ry = %f\n", scene.ry);
 scene.ry -= 5;
 break;
case 'Y':
 scene.ry += 5;
 break;
case 'z':
 scene.tz -= .02;
 fprintf(stderr, " tz = %f  ", scene.tz);
 break;
case 'Z':
 scene.tz += .02;
 fprintf(stderr, " tz = %f  ", scene.tz);
 break;
case 'a':
 scene.viewangle -= 1;
 fprintf(stderr, " angle: %f  ", scene.viewangle);
```

FIG. 9I

```
  break;
case 'A':
 scene.viewangle += 1;
 fprintf(stderr, "angle: %f  ", scene.viewangle);
 break;
case 55:
 glRotatef(-5, 0.0, 0.0, 1.0);
 break;
case 57:
 glRotatef(5, 0.0, 0.0, 1.0);
 break;
case 52:
 glRotatef(-5, 0.0, 1.0, 0.0);
 break;
case 54:
 glRotatef(5, 0.0, 1.0, 0.0);
 break;
case 56:
 glRotatef(5, 1.0, 0.0, 0.0);
 break;
case 50:
 glRotatef(-5, 1.0, 0.0, 0.0);
 break;
case 'q':
 if (lights) {
     glDisable(GL_LIGHT0);
     glDisable(GL_LIGHTING);
     lights = 0;
     fprintf(stderr, "no lights  ");
 } else {
     glEnable(GL_LIGHTING);
     glEnable(GL_LIGHT0);
     glLightfv(GL_LIGHT0, GL_POSITION, lightPos);
     glLightfv(GL_LIGHT0, GL_AMBIENT, lightAmb);
     glLightfv(GL_LIGHT0, GL_DIFFUSE, lightDiff);
     glLightfv(GL_LIGHT0, GL_SPECULAR, lightSpec);
     lights = 1;
     fprintf(stderr, "lights  ");
 }
 break;
case 't':
 fprintf(stderr, "texture off  ");
 glDisable(GL_TEXTURE_2D);
 break;
case 'T':
 fprintf(stderr, "texture on  ");
 glEnable(GL_TEXTURE_2D);
 break;
```

FIG. 9J

```c
    case '?':
      fprintf(stderr, "hjkl - rotate current object\n");
      fprintf(stderr, "s/S - shrink / grow the object or zoom the
scene\n");
      fprintf(stderr, "a/A viewangle\n");
      fprintf(stderr, "z/Z camera position\n");
      fprintf(stderr, "f/F flat smooth\n");
      fprintf(stderr, "Escape quits \n");
      break;
    case 27:           /* Esc will quit */
        exit(1);
        break;
    default:
      fprintf(stderr, "Unbound key - %d  ", key);
      break;
    }
    fprintf(stderr, "\n");
    glMultMatrixf(matrix);
    glutPostRedisplay();
}

/*
 * Main Loop
 * Open window with initial window size, title bar,
 * RGBA display mode, and handle input events.
 */
int main(int argc, char** argv)
{
    glutInit(&argc, argv);
    glutInitDisplayMode (GLUT_DOUBLE | GLUT_RGBA);
    parent = glutCreateWindow (argv[0]);
    myInit();
    glutKeyboardFunc(Key);
    glutReshapeFunc (myReshape);
    glutDisplayFunc(display);
    create_menu();
    initialize_objects(argc, argv);
    glutMainLoop();
}
```

FIG. 10A

```
#ifdef WINDOWS
#include <windows.h>
#endif
#include <GL/gl.h>
include <GL/glut.h> include "warp.h"
include <stdio.h>
/**
 * Triangulate a hemisphere and texture coordinates.
 * listNum - display list number
 * numPts -  number of points to a side
 * return the display list
 */
void createHemisphere(int listNum, int numPts, int geom) {
    double incr = 1.0 / numPts;
    double u, v, x, y, z;
    float tx, tz;
    int i, j;

/* start the display list */
    glNewList(listNum, GL_COMPILE_AND_EXECUTE);

/* create the coordinates */
    /* use the square to circle map */
    /* across then down */
    v = 0;
    for (j = 0; j < numPts ; j++) {
     /* start the tri strip */
     glBegin(geom);
     u = 0;
     for (i = 0; i <= numPts; i++) {
         /* do the top point */
         /* get the XYZ coords */
         map(u, v, &x, &y, &z);

/* create the texture coord */
         tx = x / 2 + .5;
         tz = z / 2 + .5;
         if (tx > 1.0 || tz > 1.0 || tx < 0.0 || tz < 0.0) {
          printf("not in range %f %f\n", tx, tz);
         }
         glTexCoord2f(tx, tz);
```

FIG. 10B

```
    /* normal */
    glNormal3f(x, y, z);

/* create the coord */
    glVertex3f(x, y, z);

/* get the XYZ coords */
    map(u, v + incr, &x, &y, &z);

/* create the texture coord */
    tx = x / 2 + .5;
    tz = z / 2 + .5;
    if (tx > 1.0 || tz > 1.0 || tx < 0.0 || tz < 0.0) {
     printf("not in range %f %f\n", tx, tz);
    }
    glTexCoord2f(tx, tz);

/* normal */
    glNormal3f(x, y, z);

/* create the coord */
    glVertex3f(x, y, z);

/* adjust u */
    u += incr;
  }
  /* done with the list */
  glEnd();

/* adjust v */
  v += incr;
}

/* all done with the list */
glEndList();
}
```

METHOD FOR INTERACTIVE VIEWING FULL-SURROUND IMAGE DATA AND APPARATUS THEREFOR

This application is a provision of 60/071,148 filed Jan. 12, 1998 and a Continuation-in-Part of Ser. No. 08/749,166, which was filed on Nov. 14, 1996 (now U.S. Pat. No. 5,903,782).

BACKGROUND OF THE INVENTION

The present invention relates generally to a method and corresponding apparatus for viewing images. More specifically, the present invention relates to a method and corresponding apparatus for viewing full-surround, e.g., spherical, image data;

Systems and techniques for changing the perspective of a visible image in producing a resultant image, or systems and methods of transforming an image from one perspective form to another have been the subject of scientific thought and research for many years. Systems and techniques for transforming visible images can generally be divided into three separate categories:

(1) perspective generation systems and methods suitable for applications such as flight simulators;

(2) three-dimensional (3D) to two-dimensional (2D) conversion systems and methods; and (3) miscellaneous systems and methods.

The first category includes U.S. Pat. No. 3,725,563, which discloses a method of and apparatus for raster scan transformations using rectangular coordinates which are suitable for electronically generating images for flight simulators and the like. More specifically, the patent discloses a technique for raster shaping, whereby an image containing information from one viewpoint is transformed to a simulated image from another viewpoint. On the other hand, U.S. Pat. No. 4,763,280 discloses a curvilinear dynamic image generation system for projecting rectangular coordinate images onto a spherical display surface. In the disclosed system, rectangular coordinates are converted to spherical coordinates and then the spherical coordinates are distorted for accomplishing the desired simulation of curvature.

The second category of systems and techniques perform 3D-to-2D conversion, or vice versa. For example, U.S. Pat. No. 4,821,209 discloses a method of and apparatus for data transformation and clipping in a graphic display system, wherein data transformation is accomplished by matrix multiplication. On the other hand, U.S. Pat. No. 4,667,236 discloses a television perspective effects system for providing perspective projection whereby each point of a three-dimensional object is projected onto a two-dimensional plane. New coordinates X' and Y' are prepared from the original coordinates X, Y and Z, and the viewing distance D, using the general formulas X'=XD/Z and Y'=YD/Z. As the object to be displayed is rotated around the X or Y axis, the viewing distance D is changed for each point.

In the third category, miscellaneous systems and methods are disclosed by, for example, U.S. Pat. No. 5,027,287, which describes a device for the digital processing of images to obtain special geometrical effects wherein digital image data corresponding to intersection points on a rectangular X,Y grid are transposed by interpolation with respect to intersection points of a curved surface. U.S. Pat. No. 4,882,679, on the other hand, discloses a system and associated method of reformatting images for three-dimensional display. The disclosed system is particularly useful for generating three-dimensional images from data generated by diagnostic equipment, such as magnetic resonance imaging.

However, none of the above described methods or systems permit viewing in circular perspective, which is the best way to view spherical data. Circular perspective does all that linear perspective does when zoomed in, but it allows the view to zoom out to the point where the viewer can see almost everything in the spherical data simultaneously in a visually palatable and coherent way.

What is needed is a method for viewing full-surround, e.g., spherical, image data employing circular perspective. Moreover, what is needed is an apparatus for viewing fall-surround, e.g., spherical, image data employing circular perspective. What is also needed is a method for viewing full-surround, e.g., spherical, image data employing circular perspective which is computationally simple. Preferably, the method for viewing full-surround, e.g., spherical, image data employing circular perspective can be employed on any personal computer (PC) system possessing a three dimensional (3-D) graphics capability.

SUMMARY OF THE INVENTION

Based on the above and foregoing, it can be appreciated that there presently exists a need in the art for viewing methods and corresponding apparatuses which overcome the above-described deficiencies. The present invention was motivated by a desire to overcome the drawbacks and shortcomings of the presently available technology, and thereby fulfill this need in the art.

The present invention implements a novel and practical circular perspective viewer for spherical data. Moreover, it implements the circular perspective viewer within the context of existing 3D graphics utilities native to personal computers (PCs). Thus, the method and corresponding apparatus for circular perspective viewing is practical for a broad market.

One object according to the present invention is to provide a method and corresponding apparatus for modeling the visible world by texture mapping full-surround image data.

Another object according to the present invention is to provide a method and corresponding apparatus for modeling the visible world by texture mapping full-surround image data onto a p-surface whereby the resultant texture map is substantially equivalent to projecting full-surround image data onto the p-surface from a point Q inside the region X of the p-surface.

Still another object according to the present invention is to provide a method and corresponding apparatus for modeling the visible world by texture mapping full-surround image data wherein the viewer is allowed to interactively rotate the model.

Yet another object according to the present invention is to provide a method and corresponding apparatus for modeling the visible world by texture mapping full-surround image data wherein the viewer is allowed to interactively change the direction of vision.

A still further object according to the present invention is to provide a method and corresponding apparatus for modeling the visible world by texture mapping full-surround image data, wherein the viewer is allowed to interactively alter the focal length or view angle.

Another object according to the present invention is to provide a method and corresponding apparatus for modeling the visible world by texture mapping full-surround image data, wherein the viewer is allowed to interactively move the viewpoint.

Still another object according to the present invention is to provide a method and corresponding apparatus for modeling the visible world by texture mapping full-surround image data, wherein the viewpoint is close to the surface of the p-sphere.

Another object according to the present invention is to provide a method and corresponding apparatus for modeling the visible world by texture mapping full-surround image data, wherein the viewer is allowed to interactively direction of view.

A further object according to the present invention is to provide a method and corresponding apparatus for modeling the visible world by texture mapping full-surround image data, wherein the viewer is allowed to select an area of the image and cause another model of the visible world to be loaded into said viewing system.

Another object according to the present invention is to provide a method and corresponding apparatus for modeling the visible world by texture mapping full-surround image data, wherein the viewer is allowed to perform any combination of actions specified immediately above.

It will be appreciated that none of the above-identified objects need actually be present in invention defined by the appended claims. In other words, only certain, and not all, objects of the invention have been specifically described above. Numerous other objects advantageously may be provided by the invention, as defined in the appended claims, without departing from the spirit and scope of the invention.

These and other objects, features and advantages according to the present invention are provided by a method of modeling the visible world using full-surround image data. Preferably, the method includes steps for selecting a view point within a p-surface, and texture mapping full-surround image data onto the p-surface such that the resultant texture map is substantially equivalent to projecting full-surround image data onto the p-surface from the view point to thereby generate a texture mapped p-surface.

According to one aspect of the invention, the method also includes a step for either rotating the texture mapped p-surface or changing the direction of view to thereby expose a new portion of the texture mapped p-surface. According to another aspect of the invention, a first the texture mapped p-sphere is replaced by a second texture mapped p-sphere by interactively selecting the new viewpoint from viewpoints within the second texture mapped p-sphere.

These and other objects, features and advantages according to the present invention are provided by a method of modeling of the visible world using full-surround image data, the method comprising steps for providing the full surround image data, selecting a view point within a p-surface, texture mapping full-surround image data onto the p-surface such that the resultant texture map is substantially equivalent to projecting full-surround image data onto the p-surface from the view point to thereby generate a texture mapped p-surface, and displaying a predetermined portion of the texture mapped p-sphere.

These and other objects, features and advantages according to the present invention are provided by an apparatus for modeling the visible world using full-surround image data, comprising first circuitry for selecting a view point within a p-surface, second circuitry for texture mapping full-surround image data onto the p-surface such that the resultant texture map is substantially equivalent to projecting full-surround image data onto the p-surface from the view point to thereby generate a texture mapped p-surface, and third circuitry for displaying a predetermined portion of the texture mapped p-sphere.

These and other objects, features and advantages of the invention are disclosed in or will be apparent from the following description of preferred embodiments.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 9A through 9G collectively form a listing of the dedicated code for converting a general purpose computer system into the circular perspective viewing system illustrated in FIG. 8; and FIGS. 10A and 10B collectively forming a listing of an exemplary code block for triangulating a hemisphere and texture coordinates.

DETAILED DESCRIPTION OF THE PREFERRED EMBODIMENTS

The method and corresponding apparatus according to the present invention are similar to that disclosed in U.S. Pat. No. 5,684,937, which patent is incorporated herein by reference for all purposes, in that it generates perspective views derived for constants less than or equal to two, and greater than or equal to one, i.e., $1.0 \leq X \leq 2.0$. However, it will be appreciated that the inventive method and apparatus are different from U.S. Pat. No. 5,684,937 in that the method for deriving perspective is different than 'explicitly' dividing all angles by a selected constant, as disclosed in that patent. Instead, the angles are 'implicitly' divided by a constant by moving the viewpoint around inside a "p-sphere". Additional details will be provided below.

By employing the method and corresponding apparatus according to the present invention, it is possible to create a virtual pictosphere using a conventional 3-D graphics system. Preferably, the inventive method and apparatus texture map the visible world onto a sphere. It should be mentioned that when the user selects a viewpoint at the center of this sphere and renders the view using the primitives of a conventional 3D graphics system, the user implicitly divides all angles by one, and results in a linear perspective view. However, when the user selects a viewpoint on the surface of this sphere, selects a direction of view towards the center, and renders the view using the primitives of a conventional 3D graphics system, the user implicitly divides all angles by two, thus creating a circular perspective view. Moreover, by allowing the viewpoint to move around within or on the sphere, the user achieves results virtually identical to those achieved by U.S. Pat. No. 5,684,937 for constants ranging from 1.0 to 2.0.

It will be appreciated that the method and corresponding apparatus according to the present invention implement a novel and practical circular perspective viewer of spherical data. The inventive method and apparatus advantageously can be achieved within the context of existing 3-D graphics utilities and hardware native to PCs. It will be noted from the statement immediately above that the inventive method and apparatus advantageously can be implemented in a broad range of existing systems.

Figure 1:
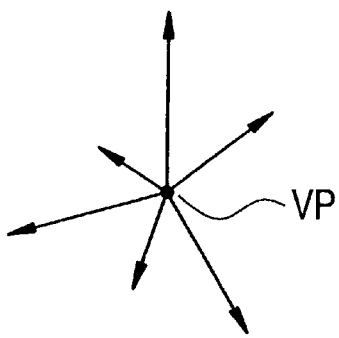
FIG. 1 illustrates a set of all rays from a predetermined viewpoint, which illustration facilitates an understanding of the present invention.
Figure 2:
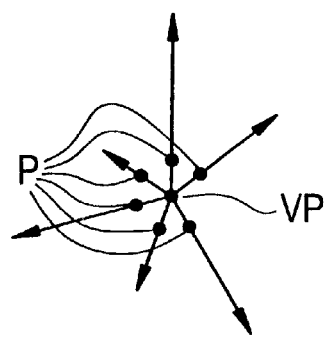
FIG. 2 illustrates a set of points, excluding the viewpoint, located on a corresponding one of the rays, which illustration facilitates an understanding of the present invention.

The method and corresponding apparatus according to the present invention are predicated on the following starting, i.e., given, conditions:

(1) the set of all rays V from a given point VP, as illustrated in FIG. 1;

(2) a set of points P not including VP, each point in P being contained by one and only one ray in V, as illustrated in FIG. 2; and (3) the set of color values C, each color in C being associated with one and only one ray in V, and also thereby associated with the point in P contained by said ray.
Moreover, the following definitions apply:

(1) POINTS P: The visible world.

Figure 3:
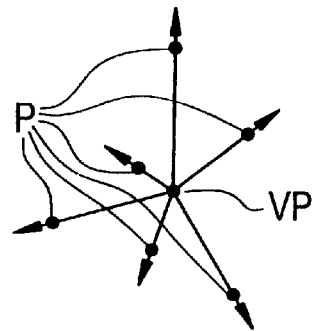
FIG. 3 illustrates the formation of a projection of the set of points, or a subset thereof, illustrated in FIG. 2.
Figure 4A:
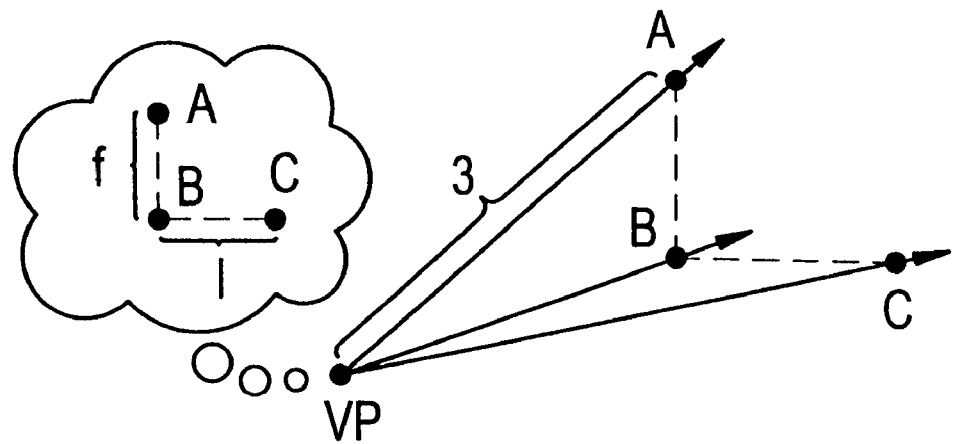
FIGS. 4A and 4B illustrate the resultant images generated by two different projections, respectively, given a constant viewpoint.
Figure 4B:
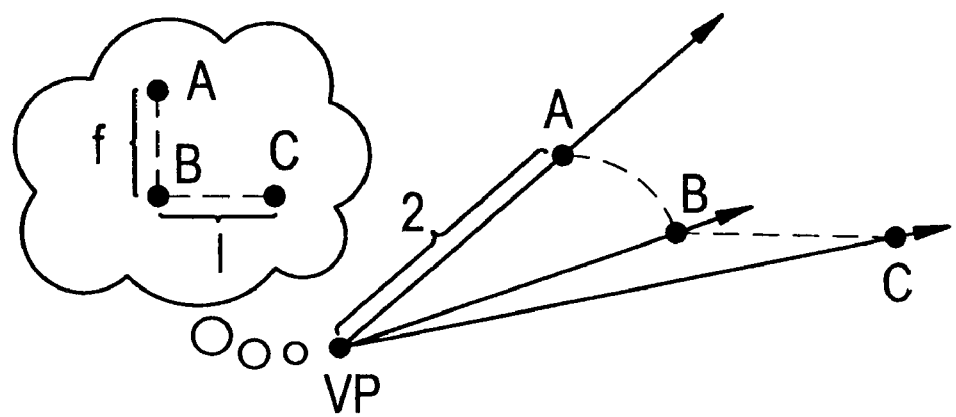

(2) A PROJECTION OF P: A subset of points P. Any number of points Pn contained in P may be slid closer to or further from point VP along their corresponding rays. The resultant new configuration of points P is called a projection of P. The concept can best be understood by referring to FIG. 3;

(3) MAGIC POINT, VIEWPOINT, OR POINT OF PROJECTION: Point VP. Please note, no matter how points P are projected, their appearance will remain the same when viewed from point VP. This latter concept may best be understood by referring to FIGS. 4A and 4B.

(4) FULL-SURROUND IMAGE DATA: data which samples the points P. This data encodes, explicitly or implicitly, the association of a color value with a given direction from a given point of projection. It should be mentioned at this point that full-surround image data is useful in many fields of entertainment because, when delivered to many viewers, it enables the construction of an independent viewing system defined below.

(5) P-SPHERE: a computer graphics representation of any polyhedron where there exists at least one point x inside (neither intersecting, nor lying outside) the polyhedron which may be connected to every point of the polyhedron with a distinct line segment, no portion of which said line segment lies outside the polyhedron or intersects the polyhedron at a point not an endpoint. The union of all such points x form the region X of the p-sphere. For a convex p-sphere, the region X is all points of the interior of the p-sphere. Examples of computer graphics objects which may be modeled as p-spheres include a tetrahedron, a cube, a dodecahedron, and a faceted sphere.

(6) P-SURFACE: a computer graphics representation of any surface with a well-defined inside and outside, where there exists at least one point x inside (neither intersecting, nor lying outside) the surface which may be connected to every point of the surface with a distinct line segment, no portion of which said line segment lies outside the surface or intersects the surface at a point not an endpoint. The union of all such points x form the region X of the p-surface. For a convex p-surface, the region X is all points of the interior of the p-surface. Examples of computer graphics objects which may be modeled as p-surfaces: tetrahedron, cube, sphere, ellipsoid, cylinder, apple torus, lemon torus, b-spline surfaces closed or periodic in u and v. A p-sphere is a p-surface.

Figure 5:
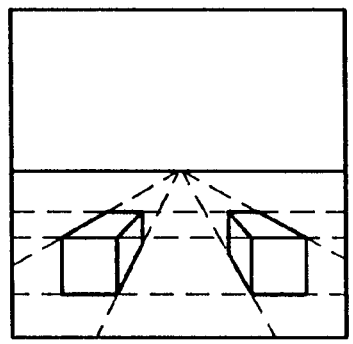
FIG. 5 illustrates the concept of linear perspective.

(7) LINEAR PERSPECTIVE: the projection of a portion of the visible world onto a plane or portion of a plane, as illustrated in FIG. 5.

Figure 6:
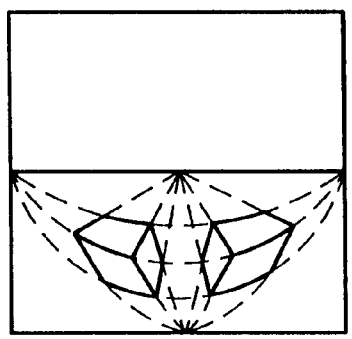
FIG. 6 illustrates the concept of circular perspective.
Figure 7:
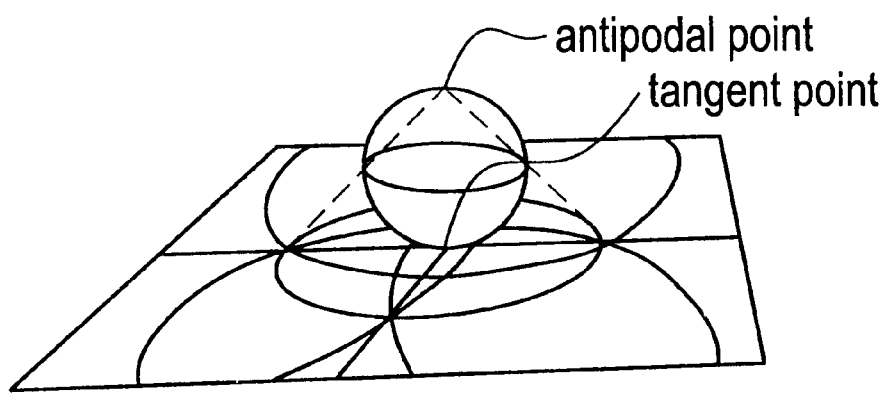
FIG. 7 illustrates the concept of stereographic projection.

(8) CIRCULAR PERSPECTIVE: the projection of the visible world, or portion thereof onto a plane, or a portion of a plane, after performing the perspective transformation of the visible world according to U.S. Pat. No. 5,684,937, where the constant used is 2. After such a transformation, when the direction of vision specified in said transformation is perpendicular to the projection plane, there is a one-to-one mapping of all the points P defining the visible world and all the points of an infinite plane. This definition is illustrated in FIG. 6;

(9) STEREOGRAPHIC PROJECTION: the one-to-one mapping of each point on a sphere to each point of an infinite tangent plane, said mapping performed by constructing the set of all rays from the antipodal point of the tangent point, the intersection of said rays with the plane defining said mapping. The understanding of this definition will be facilitated by reference to FIG. 7. Please note that circular perspective and stereographic projection produce geometrically similar (identically proportioned) mappings when the direction of vision specified in the perspective transformation of circular perspective contains the tangent point specified in stereographic projection;

(10) INDEPENDENT VIEWING SYSTEM: an interactive viewing system in which multiple viewers can freely, independently of one another, and independently of the source of the image data, pan that image data in all directions with the effect that each viewer feels like they are "inside" of that imagery, or present at the location from which the imagery was produced, recorded, or transmitted; and

(11) STANDARD COMPUTER GRAPHICS SYSTEM: a computer graphics system which supports linear perspective viewing, including the changing of the focal length or the altering of the view angle, the apparent rotation of viewed objects, and/or the apparent changing of direction of vision, and the texture mapping of image data onto objects within the class of p-surface.

It will be appreciated that in a standard computer graphics system by texture mapping full-surround image data onto a p-surface such that the resultant texture map is effectively equivalent to projecting the full-surround imagery onto the p-surface from a some point Q contained in the region X of the p-surface, a representation of the visible world is achieved.

Referring to FIGS. 9A through 9G, the method for viewing full-surround, e.g., spherical, image data will now be described. It should be mentioned that the corresponding code implementing the inventive method is written in the "C" language, although a plurality of programming languages are well known and readily adapted to this purpose. It will also be appreciated that code lines starting with "gl" or "glut" indicate calls to a conventional graphics library (GL) such as OpenGL™. One of ordinary skill in the art will readily appreciate that the last function in this listing is called main(). This is where the program starts.

It will be appreciated from inspection of FIGS. 9A through 9G that the routine main() calls various glut . . .

functions to set up GL, the graphics library used here. It will be noted that the glut... functions are part of GL. Furthermore, it will be appreciated that main() registers or maps certain keyboard events with GL with glutKeyboardFunc(Key). In other words, glutKeyboardFunc (Key) defines the response of the inventive method to operation of the corresponding "Key."

Moreover, Key() is a function describing the actions of GL to keyboard events. Of importance are keyboard events ('z' and 'Z') which move the viewpoint in and out along the Z axis relative to the "p-sphere", effectively altering the perspective of the view, and keyboard events (55, 57, 52, 54, 56 and 50) which control rotation of the "p-sphere", effectively allowing the viewer to "look around".

It will be noted that main() registers the function display() with GL, with the glutDisplayFunc(display) function. Moreover, display() uses the global variables controlled by Key() to move the viewpoint along the Z axis relative to the "p-sphere", and to rotate the "p-sphere" relative to a constant direction of view.

Preferably, display() builds the "p-sphere" with glCallList (current_texture->tex1) and glCallList(current_texture->tex2). In the first instance, tex1 is mapped to a triangulation approximating a hemisphere, and is added to the display list. In the second instance, tex2 is mapped to the same hemisphere—after rotating it 180 degrees to form a sphere—and is also added to the display list, in the function readTexture(). Preferably, tex1 and tex2 are texture maps built from two pictures, respectively, taken with a fisheye lens. Advantageously, tex1 and tex2 collectively comprise a "pictosphere." It should be noted that the triangulation approximating the hemisphere was built in the function createHemisphere(), the full listing of which is found in FIGS. 10A and 10B and not FIGS. 9A–9G.

At this point, Key() and display() have been registered with GL. The code main() then calls initialize_objects() which actually calls the routines readTexture() and createHemisphere(). All the other functions are support functions.

It will be appreciated that the user now has an instance of a p-sphere in GL made by mapping two fisheye images, e.g., photographs, to two adjoining hemispheres to thereby generate full-surround, e.g., spherical, image data. The user advantageously can interactively move the viewpoint away from the center of the p-sphere and, if so desired, very near the inside surface of the p-sphere. It should be mentioned at this point that the direction of view is still towards the center of the p-sphere. Moving the viewpoint from the center of the p-sphere automatically generates a circular perspective view, which advantageously can be displayed on display screen 20 of the PC illustrated in FIG. 8. Moving back to the center of the p-sphere, permits the user to generate a linear perspective view. It will also be appreciated from the discussion above that it is possible to rotate the surface of p-sphere, thus simulating looking around within the p-sphere.

It should be mentioned that by setting the viewpoint of the graphics system close to the center point of the p-sphere point and then enabling the viewer to rotate that p-sphere around a point close to the center point of the p-sphere, an independent viewing system providing linear perspective is achieved. Moreover, by adding the further capability of altering the focal length or angle of view, a zoom ability advantageously can be provided for the user.

It should also be mentioned that in the case where the p-surface used to model the visible world is a good approximation of a sphere, that is, a substantially better model than a tetrahedron or a cube, and where the view point of that representation is close to the approximate center of that p-surface, then by allowing the viewer to move the viewpoint away from center point to a point close to the surface of the p-surface, an independent viewing system is achieved in circular perspective. This is astounding when one considers that the native graphics system of a conventional PC only supports viewing in linear perspective. The method and corresponding apparatus according to the present invention work because such an independent viewing system models stereographic projection, which is geometrically similar to circular perspective.

Furthermore, by letting the viewer move the viewpoint outside of the p-surface, the viewer can get a feeling for how the independent viewing works. This can be useful for designers of systems containing many hyper-linked full-surround surfaces. For example, many p-spheres picturing the penthouse terraces of New York advantageously can be linked together so that the viewer may hop from p-sphere to p-sphere, simulating a tour of the terraces.

Figure 8:
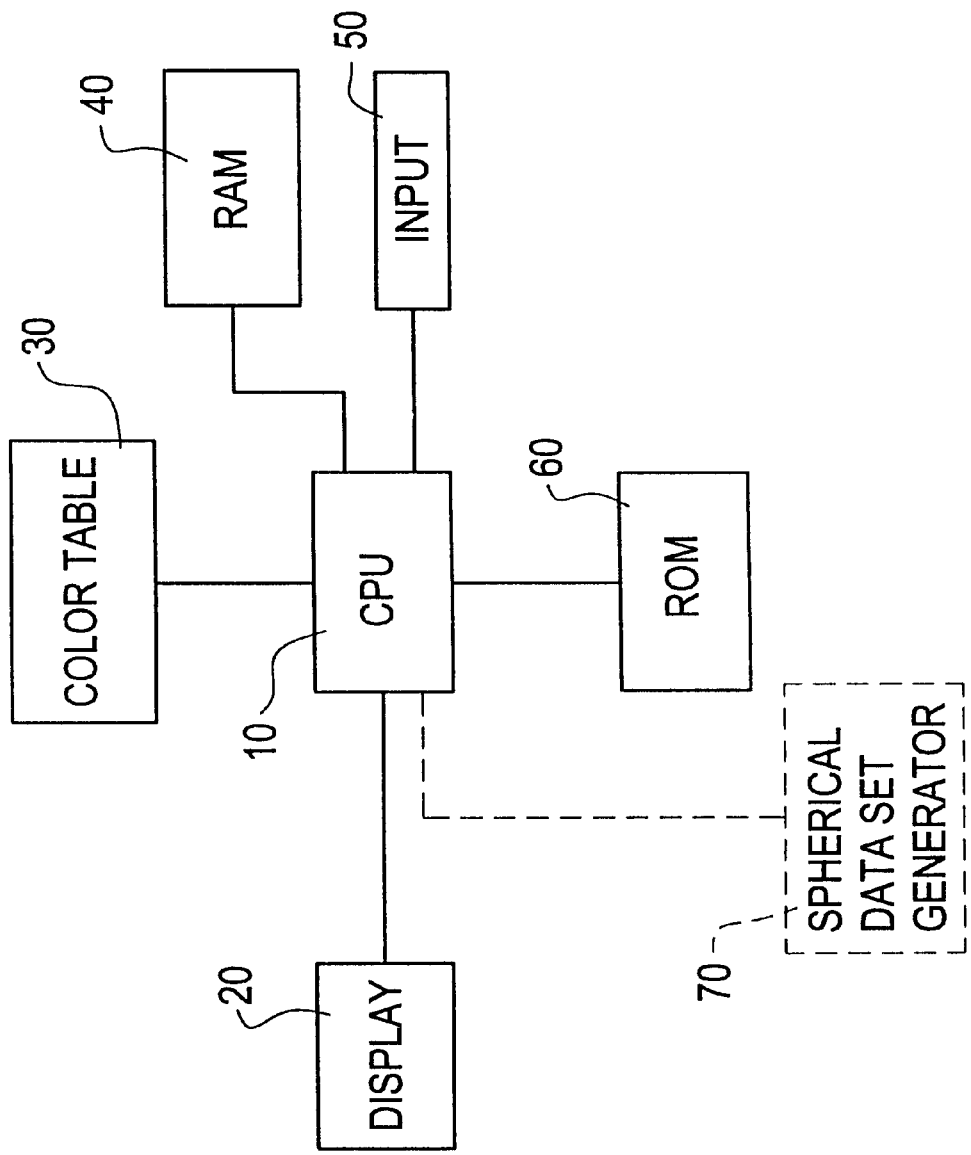
FIG. 8 is a high level block diagram of a circular perspective viewing system according to the present invention.

The above described method of the invention may be performed, for example, by the apparatus shown in FIG. 8. This viewing apparatus is composed of a central processing unit (CPU) 10 for controlling the components of the system in accordance with a control program stored in read-only memory (ROM) 60 or the like. The CPU 10 stores temporary data used during execution of the inventive method, i.e., viewing method, in random-access memory (RAM) 40. After the majority of the method steps are performed, the generated visible points are displayed on display device 20 (e.g., cathode ray tube (CRT) or liquid crystal display (LCD)) as visible points in accordance with the appropriate color values stored in color table 30, e.g., a color lookup table (CLUT) found in the graphics controller in most PCs. Advantageously, a spherical data generator device 70, such as a camera or the like, and preferably the data generator system disclosed in U.S. Pat. No. 5,903,782, which Patent is incorporated herein by reference for all purposes, may be used to generate different color values corresponding to the visible points of a viewed object, image or picture. An input device 50 is provided for entering data such as the viewer's viewing direction, reference plane, configuration (scaling) factor k, and other pertinent information used in the inventive viewing method.

As mentioned above, it will be appreciated that the method and corresponding apparatus according to the present invention advantageously can be used in an audio-visual or multimedia entertainment system. In particular, since each user advantageously can select his or her preferred view point and direction of view, multiple users can receive a single set of full-surround image data and generate corresponding multiple display images, in either linear or circular perspective.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method of modeling of the visible world using full-surround image data, said method comprising:

selecting a view point within a p-surface; and texture mapping full-surround image data onto said p-surface such that the resultant texture map is substantially equivalent to projecting full-surround image data onto the p-surface from said view point to thereby generate a texture mapped p-surface.

2. The method as recited in claim 1, further comprising rotating said texture mapped p-surface so as to simulate rotating the direction of view in the opposite direction.

3. The method as recited in claim 1, wherein said selecting step comprises selecting the view point and a direction of view, and wherein said method further comprises interactively changing said direction of view to thereby expose a corresponding portion of said texture mapped p-surface.

4. The method as recited in claim 1, further comprising displaying a predetermined portion of said texture mapped p-surface.

5. The method as recited in claim 4, wherein a viewer is allowed to interactively alter at least one of focal length or an angle of view relative to said textured mapped p-surface to thereby vary the displayed portion of said texture mapped p-surface.

6. The method as recited in claim 1, further comprising:
   displaying a predetermined portion of said p-surface:
   selecting a new viewpoint;
   repeating said texture mapping step using said new viewpoint; and
   redisplaying said predetermined portion of said p-surface,
   whereby a first image portion occupying said predetermined portion displayed during the displaying step is different than a second image portion occupying said predetermined portion during the redisplaying step.

7. The method as recited in claim 6, wherein said selecting step comprises interactively selecting said new viewpoint.

8. The method as recited in claim 7, wherein a first said texture mapped p-surface is replaced by a second texture mapped p-surface by interactively selecting said new viewpoint from viewpoints within said second texture mapped p-surface.

9. The method as recited in claim 1, further comprising:
   selecting a new viewpoint; and
   displaying said texture mapped p-surface from said new viewpoint.

10. The method as recited in claim 9, wherein the new viewpoint is close to the surface of said p-surface.

11. A method of modeling of the visible world using full-surround image data, comprising:
    providing said full surround image data;
    selecting a view point within a p-surface;
    texture mapping full-surround image data onto said p-surface such that the resultant texture map is substantially equivalent to projecting full-surround image data onto the p-surface from said view point to thereby generate a texture mapped p-sphere; and
    displaying a predetermined portion of said texture mapped p-sphere.

12. The method as recited in claim 11, further comprising rotating said texture mapped p-sphere so as to simulate rotating the direction of view in the opposite direction.

13. The method as recited in claim 11, wherein said selecting step comprises selecting the view point and a direction of view, and wherein said method further comprises interactively changing said direction of view to thereby display another portion of said texture mapped p-sphere.

14. The method as recited in claim 11, further comprising:
    selecting a new viewpoint; and
    repeating said texture mapping and said displaying steps using said new viewpoint.

15. The method as recited in claim 14, wherein a first said texture mapped p-sphere is replaced by a second said texture mapped p-sphere by interactively selecting said new viewpoint from viewpoints within said second texture mapped p-sphere.

16. The method as recited in claim 11, further comprising:
    selecting a new viewpoint; and
    displaying said predetermined portion of said texture mapped p-surface using said new viewpoint.

17. The method as recited in claim 16, wherein said selecting step comprises interactively selecting said new viewpoint.

18. An apparatus for modeling the visible world using full-surround image data, comprising:
    means for selecting a view point within a p-surface;
    means for texture mapping full-surround image data onto said p-surface such that the resultant texture map is substantially equivalent to projecting full-surround image data onto the p-surface from said view point to thereby generate a texture mapped p-sphere; and
    means for displaying a predetermined portion of said texture mapped p-sphere.

19. The apparatus as recited in claim 18, wherein said selecting means comprises means for selecting said view point and interactively selecting a direction of view to thereby interactively display portions of said texture mapped p-surface p-sphere.

20. The apparatus as recited in claim 19, further comprising means for replacing a first said texture mapped p-sphere by a second said texture mapped p-sphere by interactively selecting said viewpoint from a plurality of viewpoints within said second texture mapped p-sphere.

21. The apparatus as recited in claim 18, wherein said selecting means permits interactive selection of said viewpoint.

22. The apparatus as recited in claim 18, wherein said selecting means comprises means for selecting said view point and interactively selecting a direction of view to thereby interactively display said predetermined portion of said texture mapped p-sphere.

* * * * *